July 4, 1950

L. WOHINC 2,513,542

RELATIVELY ADJUSTABLE GAS BURNER
FOR BURNING-OFF GLASSWARE

Filed Nov. 23, 1945

Inventor
LOUIE WOHINC
By George E. Cook.
Attorney

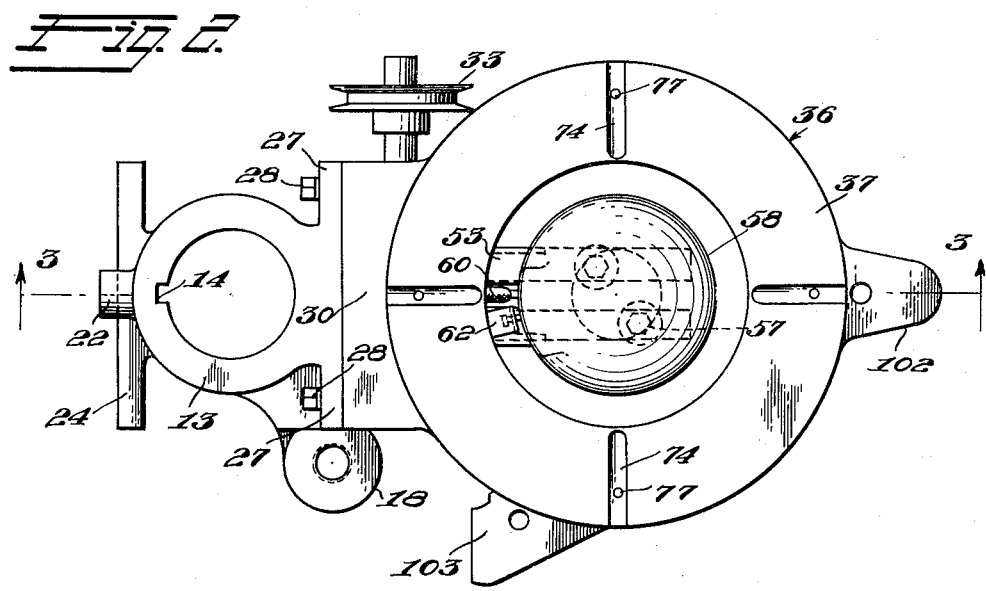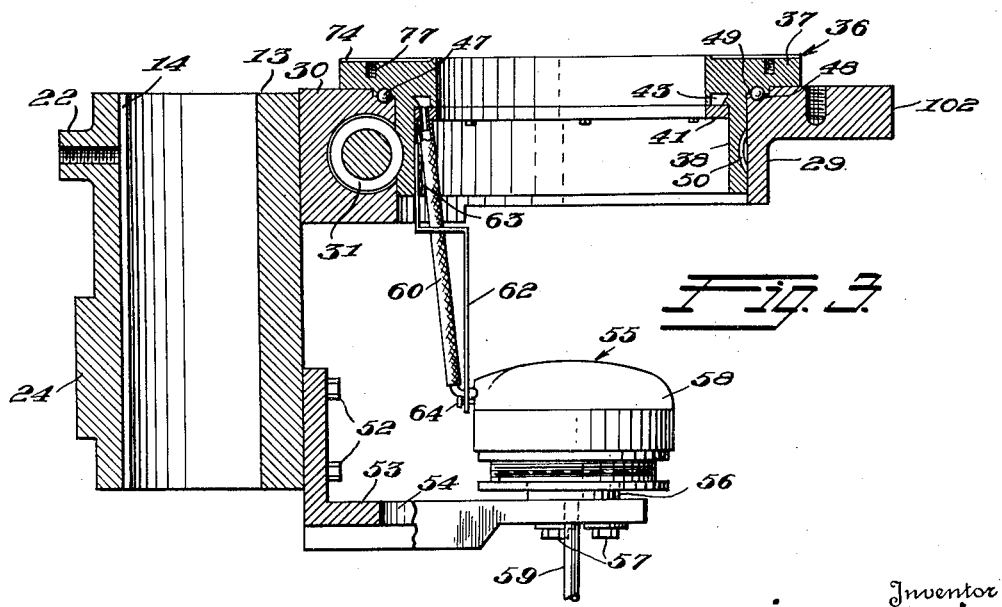

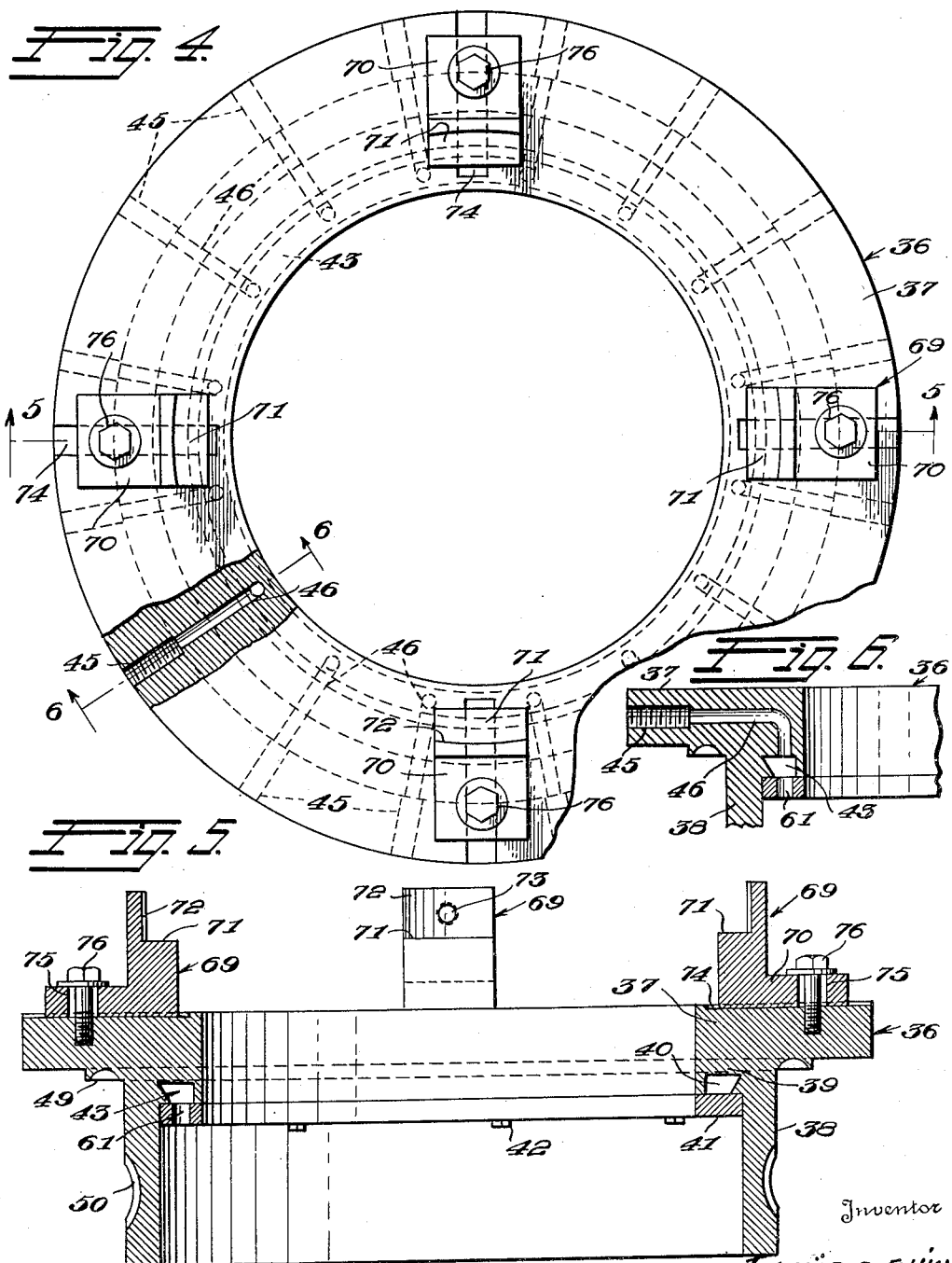

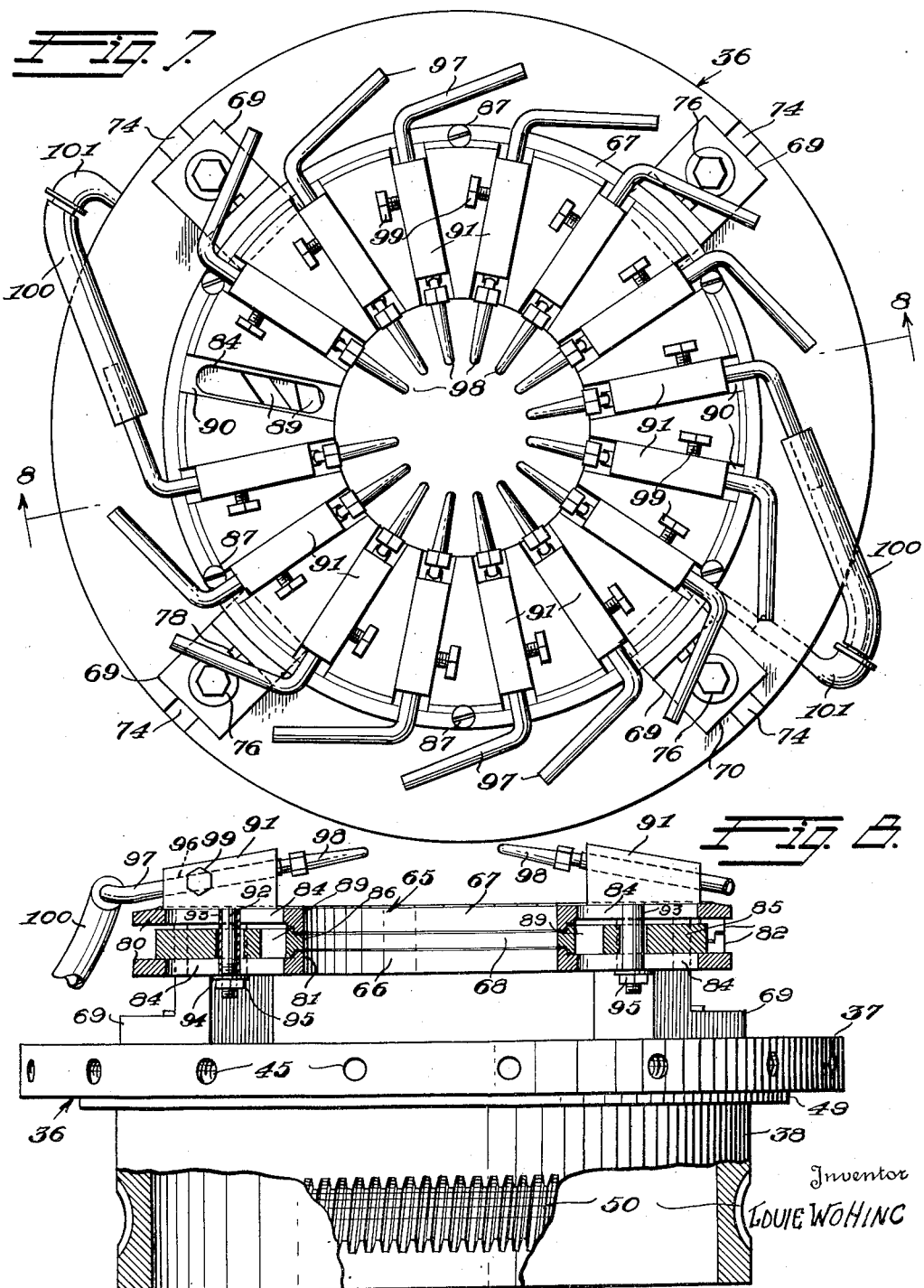

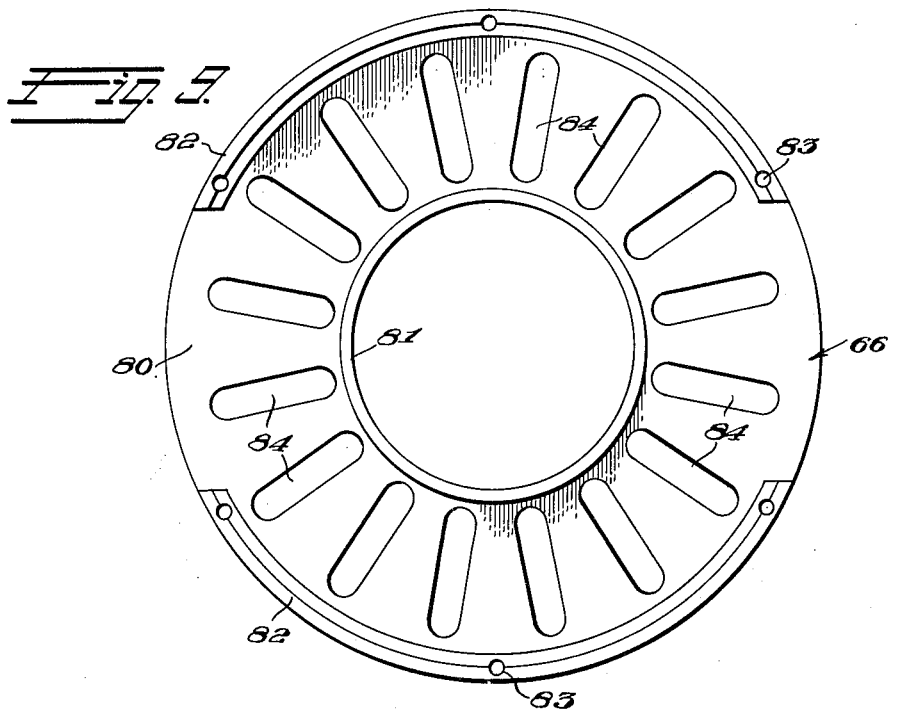
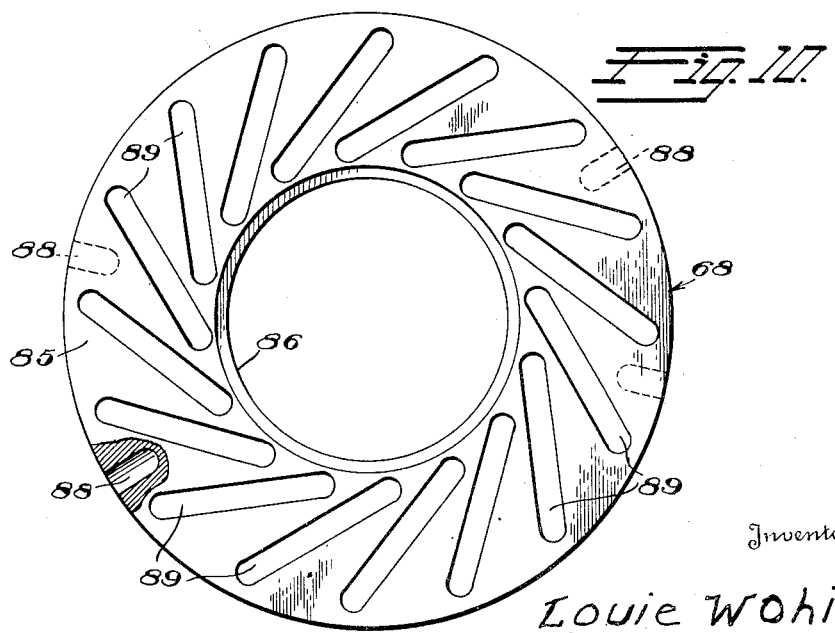

Patented July 4, 1950

2,513,542

UNITED STATES PATENT OFFICE 2,513,542

RELATIVELY ADJUSTABLE GAS BURNER FOR BURNING-OFF GLASSWARE

Louie Wohinc, Weston, W. Va., assignor to Weston Glass Company, Weston, W. Va., a corporation of West Virginia Application November 23, 1945, Serial No. 630,511

13 Claims. (Cl. 158—107)

1

This invention relates to apparatus for burning-off glassware.

The invention has for its general object to provide apparatus for burning off the moile from articles of glassware expeditiously as well as efficiently, whereby a smooth and uninterrupted edge will result on the articles at the line of the burning-off operation.

A further object of the invention is the provision of apparatus of the above-noted character in the operation of which the article is held substantially stationary during the burning-off operation.

A still further object of the invention is the provision of burning-off apparatus comprising a glass article supporting chuck and a cooperating rotatable burner for removing the moile from the supported article and simultaneously providing a smooth rounded edge thereon.

A still further object of the invention is the provision of apparatus for burning-off glassware comprising a plurality of jointly rotatable burner nozzles providing an article receiving circular opening between their ends, fuel supply and mixing means rotatable with the nozzles and a cooperating chuck for holding a glass article stationary within said opening for removal of the moile therefrom by the joint action of flames from the plurality of rotatable nozzles.

A still further object of the invention is the provision of apparatus of the character above-referred to including adjustable nozzle supporting means for simultaneously adjusting the nozzle for operation on glass articles of different diameters.

A still further object of the invention is the provision of glass burning-off apparatus which is relatively simple in construction, durable, dependable, and highly efficient in operation.

For a complete understanding of the nature and objects of the invention, reference will be had to the following detailed description, taken in connection with the accompanying drawings, wherein:

Fig. 2 is a top plan view of the structure illustrated in Fig. 3.

Fig. 3 is a vertical section in a plane substantially as represented by the line 3—3 in Fig. 2.

Fig. 4 is a broken top plan view of the structure illustrated in Fig. 5.

Fig. 5 is a vertical section in a plane substantially as represented by the line 5—5 in Fig. 4.

2

Figure 1:
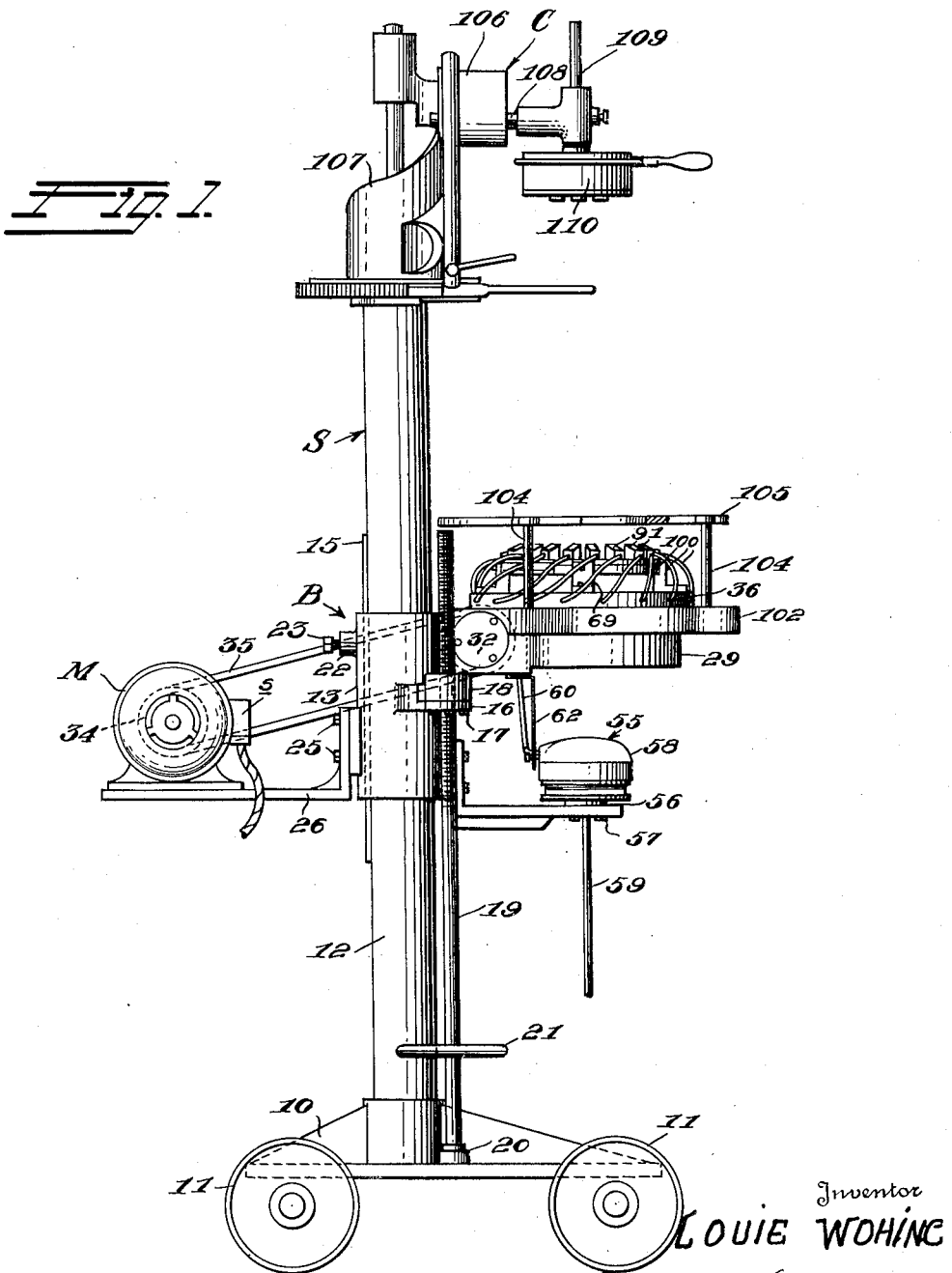
Fig. 1 is a side elevational view of the improved apparatus in accordance with a preferred embodiment thereof.

Fig. 6 is a vertical section in a plane represented by the line 6—6 in Fig. 4.

Fig. 7 is a top plan view of the rotary burner assembly with certain parts omitted.

Fig. 8 is a view partially in elevation and partially in section on a plane substantially as represented by the line 8—8 in Fig. 7, certain elements being omitted.

Fig. 9 is a top plan view of the lower plate of the nozzle adjusting assembly.

Fig. 10 is a plan view of the intermediate plate of the nozzle adjusting assembly.

Referring now in detail to the drawings by use of reference characters, and wherein like characters designate like parts in the different views, S designates a transportable stand which may be of varying forms so far as the present invention is concerned, but which preferably comprises a base 10 supported on casters or wheels 11 and a vertical cylindrical standard 12 secured to the base and extending upwardly therefrom. The upper end of the standard 12 supports a suitable chuck C later referred to.

The instant invention is particularly concerned with a burner apparatus adjustably supported by the standard 12 intermediate the base 10 and the shank C as clearly indicated in Fig. 1 and which is designated in its entirety as B.

The improved burner or glass severing apparatus in its structural components includes a supporting casting 13 which is of generally tubular form and surrounds the standard 12 as indicated in Fig. 1.

The casting 13 is provided with a longitudinal key slot 14 for cooperation with a key 15 supported by the standard 12 whereby the casting 13 is constrained against rotation about the standard 12.

The casting includes an ear 16 to which is secured by means of bolts 17 an internally threaded boss 18.

Threadedly received within the boss 18 is the upper threaded end of a rod 19 whose lower end has a swivel connection at 20 on the base 10.

A suitable hand wheel 21 is secured to the rod 19 whereby the rod may be manually rotated for adjusting the casting 13 vertically on the standard 12.

The casting 13 further includes an internally threaded boss 22 receiving a set screw 23 for securing the casting 13 in any vertically adjusted position.

The casting 13 further includes a vertical plate portion 24 to which is secured as by bolts 25 a suitable motor supporting table 26.

The casting 13 embodies laterally directed ears 27 to which is secured as by bolts 28, a burner base casting 29. The base casting 29 is of generally vertical cylindrical form but includes a portion 30 adjacent the casting 13 which is generally of rectangular cross section and which is cored out transversely of the vertical axis of the tubular base providing a cylindrical opening for receiving a worm or spiral gear 31 the supporting shaft of which is journalled in suitable removable bearings at opposed ends of the opening, one of which is designated 32 in Fig. 1.

The worm shaft extends outwardly of the respective bearing at one side of the portion 30 and has a pulley 33 secured thereto.

A suitable electric motor M is supported on the table 26 which includes a switch s and a pulley 34 about which and the pulley 33 is trained a belt 35 whereby the worm 31 is rotated upon operation of the motor.

The worm 31 may, as indicated, be rotated at substantially the same speed as the motor shaft due to the provision of speed reduction means later referred to, or the worm may, if desired, be rotated at a speed different from that of the motor shaft.

The burner proper includes a rotatable member 36 which generally comprises a horizontal circular rim 37 and a tubular portion or skirt 38 depending therefrom.

The internal diameter of the tubular portion 38 is substantially greater than that of the rim 37, thereby providing a shoulder 39 which is provided with a circular channel 40 opening through the bottom wall thereof, and the channel is closed by a ring 41 which is removably secured to the shoulder by means of bolts 42 whereby a circular fuel distributing chamber 43 is provided within the rotatable member 36.

The rim 37 is provided with a plurality of radially extending threaded apertures 45 which are equally spaced circumferentially of the rim and which as indicated in Fig. 4 are sixteen in number. The threaded apertures 45 each communicate with a bore 46 whose inner ends are in communication with the chamber 43.

The member 36 is anti-frictionally journalled in the base casting 29 by means of a circumferential series of bearing balls 47 disposed in cooperating seats 48 and 49 in the base casting 29 and rotatable member 36 respectively.

The cylindrical portion 38 is provided with an external worm gear 50 which, as more clearly indicated in Fig. 3, is in meshing engagement with the worm 31 whereby the member 36 is rotated at a speed substantially less than that of the worm 31.

Secured to the casting 13 as by bolts 52 is a bracket 53 bifurcated adjacent its free horizontal end as indicated at 54.

A fuel supply and mixing chamber 55 includes a stationary base 56 adjustably secured to the bracket 53 by bolts 57 and a cover portion 58 rotatably supported on the base 56. Fuel is admitted to the chamber 55 by means of a suitable conduit 59 extending through the bifurcation 54 and the base 56 and the fuel is conducted from the chamber 55 to the distributing chamber 43 by means of a flexible conduit 60 the upper end of which communicates with chamber 43 through an aperture 61 in ring 41 and the lower end of which is connected with the rotatable cover portion 58 for communication with the chamber 55.

It is essential that the cover portion 58 rotate in conformity with the member 36, and to effect such movement an angular strap member 62 has its upper end secured to the interior of the cylindrical portion 38 as by bolts 63 and the lower end thereof secured to the cover portion 58 by means of a bolt 64.

A nozzle supporting and adjusting assembly 65 is supported by the member 36 for rotation therewith and includes a bottom plate 66, a top plate 67, and an intermediate plate 68.

The top and bottom plates are of the same diameter and they, together with the intermediate plate, are supported above and in parallel relation with the rim 37 of member 36 by means of a plurality of brackets 69 each of which includes a horizontal base portion 70 and a vertical portion providing a seat 71 for the bottom of plate 66 and a curved plate edge engaging portion 72 centrally tapped as at 73.

The base portions each have a shallow tongue in radial guiding engagement with a radial recess 74 in the top of rim 37 and each base portion 70 is further provided with an elongated aperture 75 through which extends a stud bolt 76 in threaded engagement with a tapped aperture 77 in the rim 37.

With this construction the brackets can readily be radially adjusted for properly centering the nozzle supporting and adjusting assembly 65, and such assembly is retained on the seats 71 by means of stud bolts 78 threaded through the tapped apertures 73 and engaged with the assembly.

The top and bottom plates 67 and 66 are of substantially the same form except that the top plate is provided with nozzle supporting block guide means as later referred to and the general construction of the two plates will be readily understood upon inspection of Figs. 8 and 9 wherein it will be seen that each includes a relatively wide and thin ring member 80 having a continuous inner flange 81 and outer spaced segmental stepped flanges 82, apertured as at 83. Each ring member is provided with a plurality of radial slots 84, which as indicated are sixteen in number in correspondence with the apertures 45 in the rim 37 of the rotatable member 36.

The intermediate plate 68 includes a ring member 85 having an inner edge flange 86 for seating engagement between the flanges 81 and the outer edge of the ring member 85 rotatably engages the inner walls of the stepped flanges 82 which latter flanges are maintained in enter-engaging relation by means of screws 87 extended through the apertures 83, those of the lower plate preferably being threaded.

With this arrangement, the intermediate plate 68 is rotatably supported between the plates 66 and 67 and in order to effect rotation of the plate 68 it is provided with apertures 88 in its outer edge which are accessible by a suitable tool between the adjacent ends of the flanges 82.

The intermediate plate 68 is further provided with a plurality of slots 89 corresponding in number with the slots 84 but which extend at a substantial angle to the radii for a purpose later to appear.

The top plate 67 is provided with a shallow guide channel 90 immediately above each slot 84 for reception of the rectangular base of a nozzle supporting block 91 for movement of the blocks radially upon adjustment thereof in a manner later to appear.

Each block 91 is provided with a vertically depending stud 92 which may be integral with the block or suitably rigidly secured thereto.

The studs 92 have their lower ends threaded and the shanks thereof are surrounded by sleeves 93 extending vertically through corresponding slots 84 and 89, a washer 94 being maintained adjacent the lower end of each sleeve 93 as well as the lower face of plate 66 by means of a nut 95 threaded on the stud as is clearly indicated in Fig. 8.

With this arrangement, rotation of the intermediate plate 68 will by means of its oblique slots 89 effect a camming action on the sleeves 93 with the result that they will move in the radial slots 84 in a direction depending upon the direction of rotation of plate 68 and the blocks 91 will be moved simultaneously and exactly the same amount.

Each of the blocks 91 is provided with an aperture 96 which extends upwardly toward the inner end of the block and supported in the aperture 96 for longitudinal adjustment is the shank 97 of a fuel nozzle 98.

A thumb screw 99 is provided in each block 91 for retaining the respective nozzle in adjusted position.

Each of the nozzle shanks is preferably angular as indicated in Fig. 7 and a flexible conduit 100 interconnects each nozzle shank with a suitable connector 101 secured in each of the apertures 45.

The base casting 29 is provided with apertured lugs 102 and 103 receiving the lower ends of bolts or rods 104 which support a guard plate 105 above the nozzles 98.

The chuck C may be of any desirable form so far as the novel burner assembly is concerned but preferably includes a carrier 106 vertically movable on a spiral track 107. A horizontal spindle 108 is rotatably supported in the carrier 106 and carries a spindle 109 at right angles thereto, the spindle 109 being adapted to receive a suitable glass holding device 110 at each end thereof.

It should be appreciated from the foregoing disclosure that an apparatus is provided in accordance with this invention embodying in its construction cooperating elements whereby the moile may be removed from articles of glassware of varying diameters with maximum efficiency.

It is to be particularly noted that the series of nozzles 98 each provide a flame and that upon rotation of the member 36 and accordingly all of the nozzles, the series of independent flames merge into one another thereby providing a substantially unbroken circular flame of such intensity that the moile is removed and the edge of the glass article beaded or properly burned to provide a smooth rounded edge or rim as would be expected in high-grade glassware.

It is to be further noted that the nozzles are all simultaneously adjustable radially of the adjusting assembly 65 for operation on glassware articles of varying diameters and also that the adjusting assembly is adjustably supported on the rotatable member 36 whereby the nozzles may be adjusted as a unit for properly centering the opening between the ends of the nozzles with respect to the article holding and presenting chuck C.

It is also to be noted that the nozzles, fuel distributing chamber and the fuel supply and mixing chamber all rotate in unison thereby assuring flames of uniform intensity from each of the nozzles.

While the invention has been disclosed in a single physical embodiment thereof, such is to be considered as illustrative only, and not restrictive, the scope of the invention being defined in the subjoined claims.

What I claim and desire to secure by U. S. Letters Patent is:

1. A burner structure for use in glassware burning-off apparatus comprising a standard a base secured to the standard, a member rotatably supported on the base, means for rotating the member, a plurality of burner nozzles supported on the member, a fuel distributing chamber in the member, conduit connections between the chamber and nozzles, fuel supply means supported by the standard, said fuel supply means comprising a stationary base and a cover rotatably supported on the base, and means connecting the cover with the member for rotation therewith, and a flexible conduit between and communicating with the cover and the distributing chamber.

2. The structure according to claim 1 wherein the means for rotating the member comprises a spiral gear supported by the base in meshing engagement with a gear externally of the member, and a motor supported by the standard in driving connection with the spiral gear.

3. A burner structure for use in glassware burning-off apparatus comprising a base casting having a circular opening, a member comprising a circular rim rotatably supported on the base casting and a tubular portion having bearing in said opening, brackets adjustably supported on said rim, a circular nozzle support resting on said brackets, a plurality of nozzles carried by said support, fuel supply and mixing means rotatable with said member and means for rotating said member.

4. A structure according to claim 3 wherein said fuel supply and mixing means comprises a circular fuel distributing chamber in said member having conduit connections with said nozzles, and a fuel supply and mixing chamber in communication with said distributing chamber rotatably supported by the base and having connection with the member for rotation therewith.

5. A structure according to claim 3 wherein said nozzle support comprises a pair of spaced circular fixed plates having corresponding radial slots and an intermediate rotatable plate having a corresponding number of slots in angular relation to the slots of the first plates, said nozzles each having a projection extending through corresponding slots in the plates whereby upon rotation of the intermediate plate the nozzles will all be moved radially of the support.

6. A burner structure for use in glassware burning-off apparatus comprising a base casting having a central circular opening, a member comprising a circular rim rotatably supported on the base casting and a tubular portion having bearing in said opening, means for rotating said member, a circular fuel distributing chamber in said member, a fuel supply and mixing chamber rotatably supported by said base casting and connected with said member for rotation therewith, a conduit connection between said fuel distributing chamber and said fuel supply and mixing chamber, a plurality of circularly arranged nozzles supported by said member for rotation therewith with the ends of the nozzles defining an article receiving opening whose center is in the axis of the opening in said base casting, and conduit connections between the fuel distributing chamber and said nozzles.

7. The structure according to claim 6 wherein said nozzles are independently and collectively adjustable relative to said axis and further collectively adjustable transversely of said axis.

8. The structure according to claim 6 wherein said nozzles are adjustably supported on a circular member adjustably supported on said circular rim.

9. A structure according to claim 6 wherein said nozzles each include an elongated shank supported in an aperture in a block for axial and rotative adjustment therein.

10. A structure according to claim 6 together with a centrally apertured guard plate supported by said base casting and disposed above said nozzles in parallel relation to said circular rim.

11. A burner structure for use in glassware burning-off apparatus comprising a base having a circular opening, a member rotatably supported on the base and including a circular rim overlying the base and a tubular portion having bearing in said opening, a nozzle support disposed on said member, a plurality of nozzles carried by the support, means for supplying fuel to the nozzles, and means for rotating the member, said nozzle support being adjustably supported on said member and including rotatable means for simultaneously adjusting said nozzles radially of said rim.

12. A burner structure for use in glassware burning-off apparatus comprising a base having a circular opening, a member rotatably supported on the base and including a circular rim overlying the base and a tubular portion having bearing in said opening, a nozzle support disposed on said member, a plurality of nozzles carried by the support, means for supplying fuel to the nozzles, and means for rotating the member, said fuel supply means including a distributing chamber in said member and having conduit connections with said nozzles, and a fuel supply and mixing chamber rotatably supported by the base, connected with the member for rotation therewith and having a conduit connection with said distributing chamber.

13. A burner structure for use in glassware burning-off apparatus comprising a base having a circular opening, a member rotatably supported on the base and including a circular rim overlying the base and a tubular portion having bearing in said opening, a nozzle support disposed on said member, a plurality of nozzles carried by the support, means for supplying fuel to the nozzles, and means for rotating the member, said member rotating means comprising a spiral gear in said base in meshing engagement with a worm gear externally of said tubular portion, and a motor supported by the base and having a driving connection with the spiral gear.

LOUIE WOHINC.

REFERENCES CITED

The following references are of record in the file of this patent:

UNITED STATES PATENTS

| Number | Name | Date |
| --- | --- | --- |
| 1,810,713 | Kinkaid | June 16, 1931 |
| 1,832,039 | Millar | Nov. 17, 1931 |
| 2,102,357 | Dichter | Dec. 14, 1937 |
| 2,215,980 | Schreiber | Sept. 24, 1940 |
| 2,361,824 | Dorman | Oct. 31, 1944 |